Sept. 11, 1962 N. F. STREET 3,053,988
CYCLICAL AUTOMATIC CONTROL APPARATUS
Filed Oct. 4, 1957 2 Sheets-Sheet 1
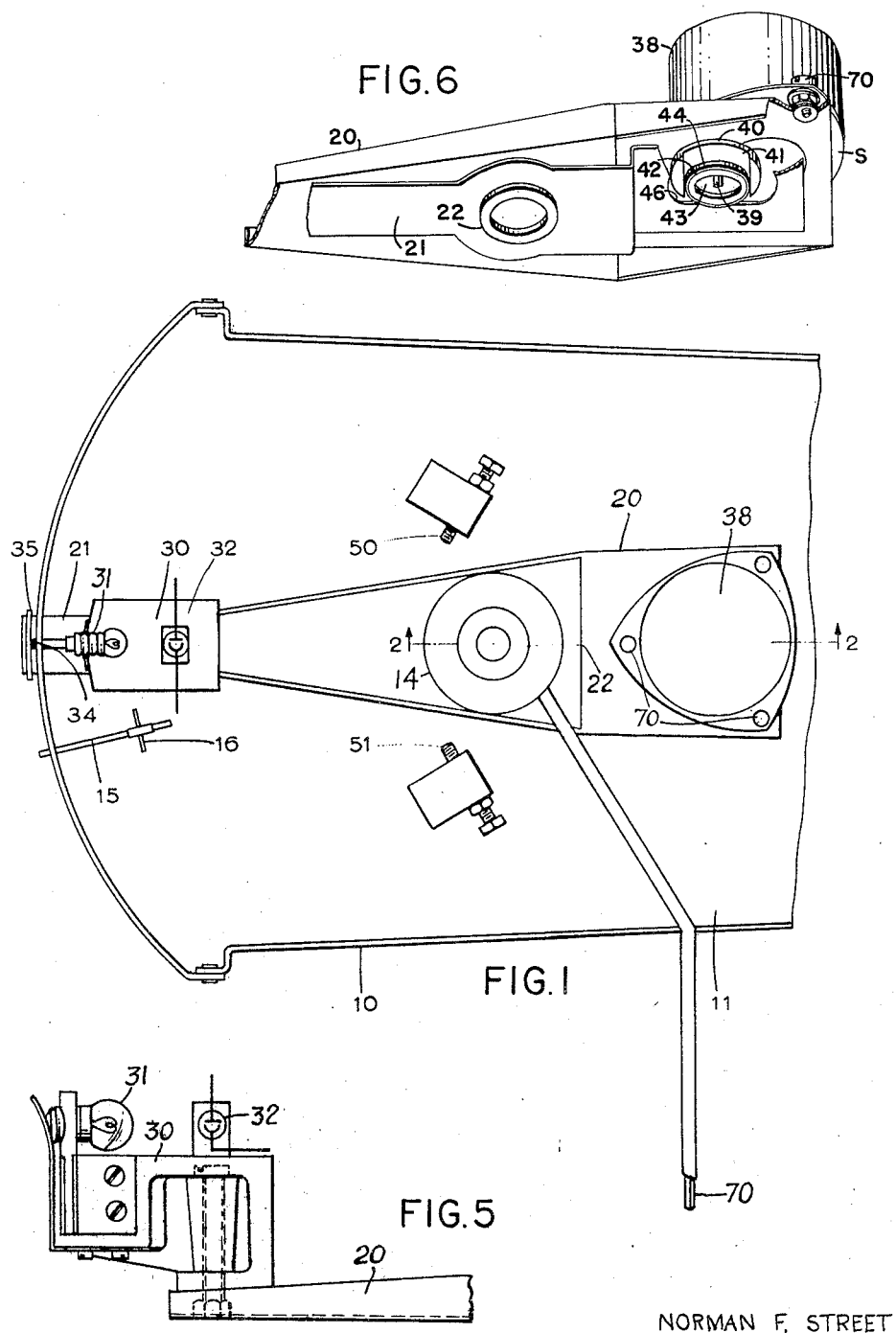
NORMAN F. STREET
INVENTOR
by Moore and Hall
HIS ATTORNEYS Sept. 11, 1962 N. F. STREET 3,053,988
CYCLICAL AUTOMATIC CONTROL APPARATUS
Filed Oct. 4, 1957 2 Sheets-Sheet 2
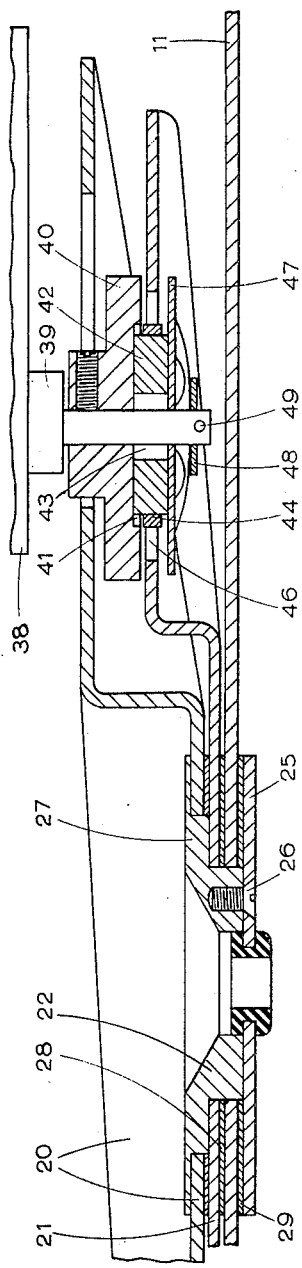
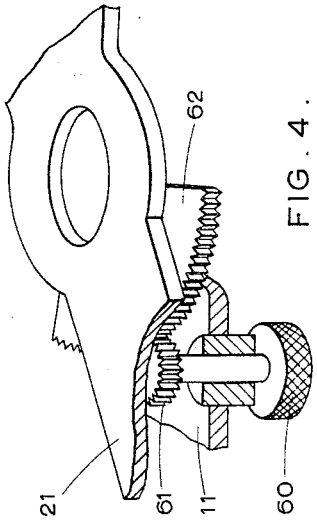
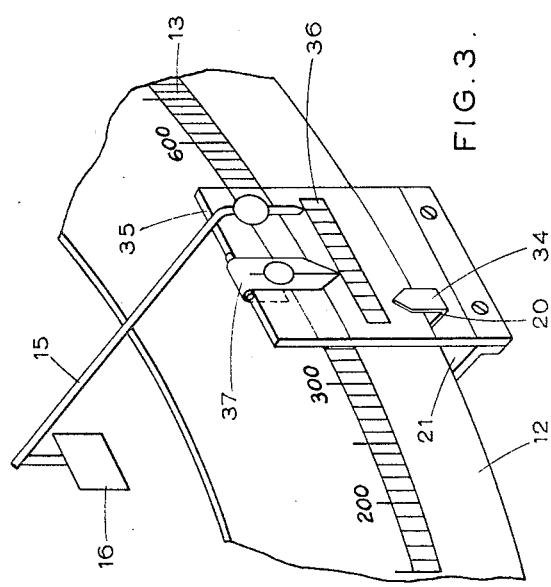
NORMAN F. STREET
INVENTOR
by Moon and Hall
HIS ATTORNEYS United States Patent Office 3,053,988
Patented Sept. 11, 1962

3,053,988
CYCLICAL AUTOMATIC CONTROL APPARATUS
Norman F. Street, Kelvin Works, Kelvin Ave.,
Hillington, Glasgow, Scotland
Filed Oct. 4, 1957, Ser. No. 688,235
Claims priority, application Great Britain Oct. 4, 1956
1 Claim. (Cl. 250—231)

This invention relates to the type of apparatus which indicates a variable and controls the variable to a pre-selected value by detecting any deviation from the pre-selected value and making an appropriate correction. In such control apparatus it is often desirable that the corrective action at any time should be approximately proportional to the deviation of the variable from the pre-selected value at that time. In some cases, however, it is very costly to provide means for smoothly and progressively varying the instantaneous value of the flow of energy affecting the variable and in these cases a cyclical arrangement is often provided whereby pulses of energy are caused to affect the variable and proportionality is achieved by varying the "on off" ratio of the pulses.

It is well known, for instance, to control the temperature of a furnace in this manner. When the furnace is first switched on, in the case of an electrically heated furnace, and heating up from cold, current is allowed to flow continuously in the heater windings. As the pre-selected temperature is approached, it is arranged that the current should be interrupted cyclically, the interruptions increasing in length until the pre-selected temperature is reached, at which stage the duration of each interruption is approximately half of each cycle. If the temperature exceeds the pre-selected value, the duration of each interruption will exceed the duration of each pulse of current in proportion to the excess of temperature over the desired value. It will be seen that in this way the duration of current flow is varied so that its integrated value over a period of time varies inversely with the temperature of the furnace and in this way proportional control is achieved.

It is the object of this invention to provide improved proportional control apparatus of the type referred to in which pulse time proportional action is achieved by movement of a control mechanism with respect to an indicating scale.

It is a further object of this invention to provide in such proportional control apparatus, means of indicating both the position of the control mechanism with regard to the instrument scale and the width of the proportional band over which the control mechanism is operating.

In addition it is an object of the invention to provide means for adjusting the proportional band width by means readily accessible to the operator.

According to this invention there is provided an instrument for indicating a variable and controlling the variable to a pre-selected value comprising a pointer moving over a scale to indicate the instantaneous condition of the variable, a control device for controlling the value of the variable, a first adjustable member, on which the control device is mounted, said pointer carrying control means cooperating with said control device to cause the latter to effect control of the variable at a pre-selected position on the scale, and a second adjustable member carrying a marker cooperating with the scale, said second member being movable manually so that the marker may be set to indicate the pre-selected control position on the scale, means to effect an oscillating motion of said control device in the path of the control means, means for varying the extent of the oscillating motion, and means for adjusting the first and second members in unison along the scale.

It may be further arranged that the marker attached to the second member is transparent and that this transparent marker carries a subsidiary scale graduated for example in terms of percentage of length of the main scale. In this way, the marker attached to the first member moves over the transparent scale of the marker attached to the second member and indicates the width of the proportional band over which the instrument is operating.

Control of the variable may be effected by means of a photocell and lamp unit such as shown in U.S. Patent No. 2,928,954 or, if preferred, may be effected by means of tuned coils in an oscillatory circuit such as is described in United Kingdom Patent No. 664,118.

For the purposes of describing an embodiment of the invention according to this specification, reference will be made to a photocell and lamp control unit and the invention will be described in operation to effect control of furnace temperature.

The invention will now be further described by way of example with reference to the accompanying diagrammatic drawings wherein an apparatus made in accordance with the invention is illustrated but only such parts are shown as are necessary for the understanding of the invention.

FIGURE 1 is a plan view of the apparatus;
FIGURE 2 is a sectional view on the line 2—2 on FIGURE 1;
FIGURE 3 is a perspective view showing the main parts visible to the operator;
FIGURE 4 is a view of a detail to be described;
FIGURE 5 is a fragmentary elevation of a control portion of one form of the invention; and
FIGURE 6 is a fragmentary perspective view of part of the assembly of a device according to the invention.

The apparatus comprises a casing having side walls 10 (FIGURE 1) and a base plate 11 (FIGURE 2) and carrying a curved scale plate 12 marked in degrees of furnace temperature as shown at 13 in FIGURE 3.

The temperature of a furnace is detected, in this case, by a pyrometer, having a thermo-couple 70, the pointer 15 of which is adapted to move over the scale plate 12 to indicate the instantaneous temperature of the furnace. The pryometer movement 14 carries a vane 16 which works in conjunction with a lamp 31 and photocell unit 32 together constituting part of a known form of control device to effect control of the furnace at a pre-selected temperature. First and second adjustable members 20, 21 in the form of arms are mounted scissors-fashion on a common pivot bush 22 which in turn is mounted on the base plate 11. A support washer 25 is attached to the bush 22 by screws 26 so as to clamp the plate 11 and member 21 between the washer 25 and a flange 27 on the bush 22. Shims 28, 29 are provided between the parts on the bush 22 whereby the clamping effect is so selected that the member 20 is movable with respect to the member 21 but is frictionally engaged by member 21 more firmly than it is, by bush 22. The members 20, 21 are normally held together frictionally for movement in unison but can be adjusted to required relative angular disposition.

The member 20 carries at its forward end a platform 30 on which is mounted the lamp 31 and photocell 32 between which the vane 16 can move. The forward end of the member 20 also carries an indicator 34 (FIGURE 3).

The member 21 at its forward end carries a transparent scale plate 35 on which is marked a subsidiary scale 36 which may be marked in units which are any selected percentage of the main scale. This subsidiary scale cooperates with the indicator 34.

The member 21 also carries a marker 37 which is in the form of a spring clip on the scale plate 35 and scale 36.

The rear end of the member 20 carries an electric motor 38 the spindle 39 of which carries cam means consisting of a block 40 fixed to the spindle and having a slot 41 in its underneath surface, and a cam (e.g. an eccentric) 42 operating in said slot 41. This cam 42 loosely surrounds the spindle 39 with a gap 43 whereby the cam can be adjusted along the slot 41 so that the axis of the cam 42 can be offset to a variable extent in relation to the axis of the spindle 39 so as to vary the throw of the cam 42.

The cam 42 carries a cam ring 44 which operates in an opening or slot 46 in the second arm 21 whereby rotation of the cam oscillates member 20 in relation to the member 21 so that the indicator 34 sweeps back and forth across a certain part of the scale 36, while the arm 21 and scale plate 35 will remain stationary except when adjusted by hand.

The cam 42 is clamped frictionally between the block 40 and a washer 47, the latter being held by spring washer 48 and pin 49.

The member 21 can be moved by hand along the scale carrying the member 20 with it frictionally until the latter engages one of two stops 50, 51 (FIGURE 1) whereupon the member 20 is brought to rest and the member 21 may be moved further whereby the cam 42 is moved along the slot 41 to adjust the throw of the cam 42 and therefore also to adjust the width of the band over which the control operates, such width being indicated by the indicator 34 on the scale 36. If desired a knob 60 and gearing 61, 62 (FIGURE 4) may be provided for moving the member 21; the knob 60 will be arranged outside the casing 10, 11 in a position readily accessible to the operator.

When using the apparatus the motor 38 is switched on and the knob 60 is operated to bring the marker 37 opposite to the part of the scale 13 corresponding to the temperature at which it is required to hold the furnace. As the temperature increases the pointer 15 will approach the marker 37 until the vane 16 obscures the light from the lamp 31 to the photocell unit 32 both of which are oscillating since they are carried by the oscillating member 20. This will result in a control to reduce the quantity of fuel and/or air supply to the furnace. Only a small degree of control will be effected since the lamp and cell quickly move away from the vane. The pointer 15 and vane 16 continues to approach the selected position and the intervals of obscuration of the beam increase until the selected position is reached when the fuel and/or air supply will be maintained at the required level. Movement of the pointer 15 and vane 16 to either side will result in further control up or down to retain the temperautre approximately constant. At the selected position the oscillation of the member 20 causes off and on control periods to continue successively with the required proportionality between these periods.

If the temperature varies over too wide a range the throw of the cam 42 will be adjusted to decrease the width of the band or range over which control occurs.

If the pointer 15 finally becomes steady at a position which is offset from the pre-selected position e.g. due to a condition known as "proportional offset" the marker 37 may be moved along the scale 36 to offset the error.

For example if the pointer 15 becomes steady at a position two marks to the right of the central mark of the scale 36, the marker 37 will be offset two marks to the right of the central mark. The member 20 is now reset to bring the marker 37 to the required selected position on the main scale 13. When the pointer now becomes steady it will be in alignment with the marker 37 and the required furnace temperature will be mtaintained.

While there has been described above what are presently believed to be the preferred forms of the invention, variations thereof will be obvious to those skilled in the art and all such changes and variations which fall within the spirit of the invention are intended to be covered by the generic terms in the appended claim, which are variably worded to that end.

I claim:

In an apparatus for indicating a variable and controlling the variable to a pre-selected value, having a scale, a pointer mounted for moving according to changes in said variable over the scale to indicate the instantaneous value of the variable, and a control device for controlling the value of the variable; first and second adjustable members having their forward ends adjacent each other, means for mounting said first and second members on a common pivot and holding them together frictionally, a control device mounted on the forward end of the first adjustable member for controlling the value of the variable, a control means carried by the pointer and cooperating with the control device to cause the latter to effect control of the variable at a pre-selected position on the scale, a marker on the forward end of the second adjustable member cooperating with the scale, an indicator on the front end of said first member, an electric motor mounted on one of said adjustable members, cam means driven by the motor and cooperating with the other of said adjustable members for continuously oscillating said first adjustable member about said common pivot, means for varying the throw of the cam means, means for adjusting said first and second adjustable members in unison about said common pivot whereby the marker can be set to indicate the pre-selected control position on the scale, friction means for holding the cam means against inadvertent adjustment of its throw, said scale comprising a transparent plate carried by said second member, a second scale carried by said first member and positioned behind said transparent plate to be viewed therethrough; whereby said second scale, said scale comprising a transparent plate, said pointer, said indicator and said marker may be observed simultaneously in cooperative relation.

References Cited in the file of this patent

UNITED STATES PATENTS

| | | |
|---|---|---|
| 447,386 | Vuillier | Mar. 3, 1891 |
| 2,218,502 | Breitenstein | Oct. 22, 1940 |
| 2,249,682 | Clark | July 15, 1941 |
| 2,549,461 | Haller | Apr. 17, 1951 |
| 2,571,822 | Bohn | Oct. 16, 1951 |
| 2,702,843 | Taylor | Feb. 22, 1955 |
| 2,838,956 | Schneider | June 17, 1958 |

FOREIGN PATENTS

| | | |
|---|---|---|
| 545,277 | Italy | June 25, 1956 |